United States Patent Office 3,699,066
Patented Oct. 17, 1972

3,699,066
WATER-DISPERSED ANIONIC RESIN COMPOSITIONS STABILIZED AGAINST AGGLOMERATION
Jerry Hoyt Hunsucker, Terre Haute, Ind., assignor to Commercial Solvents Corp.
No Drawing. Continuation-in-part of application Ser. No. 46,477, June 15, 1970. This application Oct. 8, 1971, Ser. No. 187,889
Int. Cl. C08g 17/16, 51/60
U.S. Cl. 260—22 EP    3 Claims

ABSTRACT OF THE DISCLOSURE

A stabilizer for water-dispersible resin consisting of an alkanolamine dodecyl benzene sulfonate salt. The stabilizer provides a method of controlling relative concentrations of bath components during the electrodeposition process of coating articles with a resin.

CROSS REFERENCE TO RELATED APPLICATIONS

This application is a continuation-in-part of applicant's co-pending application Ser. No. 46,477, filed June 15, 1970 now abandoned.

BACKGROUND OF THE INVENTION

This invention relates to stabilizers for water-dispersed resins and improved coatings deposited therefrom. In a particular aspect, this invention relates to stabilizers for aqueous resin dispersions useful in electrodeposition processes and to improved baked coatings obtained therefrom.

It is known to provide protective coatings for metal articles by the electrodeposition process, also known as electropainting. In this process the article to be coated is made the anode of an electrical circuit and is partially or wholly immersed in an aqueous resin dispersion. Resins employed in this process are characterized by having carboxylic acid groups neutralized with ammonia, an amine, or an alkanolamine and thus are ionic, and usually colloidal in nature. Sometimes surface active agents are also added.

When a cathode is inserted in the solution and an electrical current is applied across the electrodes, the dispersed resin is discharged onto the anode (the article to be coated) to which it adheres. When the coating becomes sufficiently thick that it behaves as an electrical insulator, the current ceases to flow. The anode is then withdrawn from the solution, washed and baked at elevated temperatures to provide a durable coating. The process is frequently employed on a large scale and typically a given lot of electrodeposition composition may be in use for 4–6 weeks or longer.

During the electrodeposition process, the cation, i.e. the ammonia, amine, or alkanolamine used to neutralize the resin, is discharged at the cathode where it redissolves as the free base and the solution grows more alkaline as the electrodeposition continues.

This process has been very successful but one of the problems encountered has been the stability of the amine-neutralized resin dispersion during storage and use. The colloidal resin particles tend to agglomerate so that during deposition an excessively thick film is laid down which, upon baking, gives an undesirable rough, wrinkled appearance. Inasmuch as the agglomerated resin particles are submicroscopic in size, the defect is seldom detected until after the first article to be coated has been baked and inspected, during which time a large number of articles may have been treated and are subject to rejection for inferior quality.

Thus there has long been a need for a method for improving the stability of colloidal resin dispersions thereby inhibiting agglomeration and reducing or eliminating rejects due to poor quality.

Another problem encountered in this process is the control of relative concentrations of bath components throughout extended periods of continuous electroplating. This is particularly true of the ammonia or amine, including alkanolamine, used to neutralize the resin as well as the dispersing agents. Ordinarily these materials deplete at a significantly lower rate than does the resin and their concentration in the bath tends to rise during the electrocoating process unless some method is provided for their selective removal from the ssytem. A. E. Gilchrist in U.S. Pat. 3,304,250, disclosed a method for controlling this problem based on the principle of electrodialysis. Usually, however, when the component is ammonia or an amine, the bath can be heated and the excess amine removed by distillation. However, some amines and alkanolamines, e.g. as set forth by Gilchrist, are too high boiling to be removed by such a step.

SUMMARY OF THE INVENTION

It is an object of this invention to provide stabilizers for aqueous resin dispersions useful for coatings.

It is another object of this invention to provide a method for control of relative concentrations of bath components during the electrodeposition of water-dispersed resins.

It is yet another object of this invention to provide baked coatings of improved hardness from the electrodeposition process.

Other objects of this invention will be apparent to those skilled in the art from the disclosure herein.

It has been discovered that the addition of from 0.1–1.0%, based on the weight of the resin, of an alkanolamine salt of dodecyl benzene sulfonic acid to a colloidal resin dispersion suitable for electrodeposition provided improved stability and freedom from agglomeration of the resin during storage. The alkanolamine of the present invention corresponds to the following general formula:

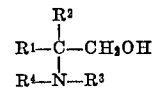

where $R^1$ is hydrogen, methyl, ethyl or hydroxymethyl; and $R^2$ is hydrogen, methyl, ethyl or hydroxymethyl; $R^3$ and $R^4$ are hydrogen or hydroxymethyl. $R^1$ and $R^2$ can be the same or different and $R^3$ and $R^4$ can be the same or different.

Unexpectedly, presence of the aforedescribed stabilizer in the bath during the electrodeposition process prevents the build-up of the ammonia or amine, including alkanolamine, which was used to neutralize the resin.

DETAILED DISCUSSION

The stabilizer of the present invention consists of the dodecyl benzene sulfonic acid salt of an alkanolamine or mixture thereof, including, but not limited to, 2-amino-1-butanol; 2-amino-2-methyl-1-propanol; ethanolamine; diethanolamine; triethanolamine; 2-amino-2-methyl-1,3-propanediol; 2-amino-2-ethyl-1,3-propandiol and 2-amino-2-hydroxymethyl-1,3-propanediol.

The stabilizer is readily prepared by known methods by reacting dodecyl benzene sulfonic acid with an alkanolamine in about a 1:1.5–2.0 mole ratio. Preferably the reaction is carried out in a reaction medium, e.g. water, or lower molecular weight alcohol or a mixture thereof, in an amount sufficient to provide a homogeneous solution of the neutral salt. The reaction is exothermic, so some cooling means may be desirable to dissipate the heat of reaction. The solution of stabilizer so prepared is suitable for use as is without further processing. The stabilizer is employed with the resin compositions in a concentration of from about 0.1 to about 1.0% by wt. (100% solids basis) based on the weight of the resin.

The stabilizer of the present invention is suitable with any of the known electrodeposition-type resins, i.e. water-dispersible, insulating, self cut-off anionic resins, neutralized or partially neutralized with ammonia or a water-soluble amine or alkanolamine, and having an acid value of 35-120. Acid value, or acid number, is defined as the number of milligrams of KOH required to neutralize the free acids in 1 gram of a substance.

Such resins include, but are not limited to, drying oils and alkyds, epoxy, phenolic, alkyd-amino combinations, amino resins, acrylics, polyesters, trimellitic anhydride condensates. Such resins are well-known in the art. They are discussed, for example, by R. L. Yeates in "Electropainting," chapter 4, Robert Draper Ltd., Teddington, England, 1966, so there is no need to discuss them at length here.

The most common water-soluble polymers have carboxyl groups along the polymer chain. The backbone of the polymer may be based on a variety of materials such as alkyds, drying oils, acrylics or styrene and, of course, copolymers of these. The carboxyl groups can be introduced into the polymer by copolymerization with such materials as acrylic acid, methacrylic acid or maleic anhydride. These carboxyl containing polymers are not water soluble in themselves but are made water soluble through the reaction with a base, such as sodium or ammonium hydroxide or an organic amine, such as diethylamine.

When a resin of this type is under the influence of an electric field, the positive ions ($NH_4^+$) will migrate toward the cathode and be discharged. The negative ions of the polymer (—COO)— will migrate toward and be deposited at the anode. Upon discharge at the anode, the polymer ion may undergo several reactions. For example, it may react with water and deposit as the water-insoluble acid. After the deposition is complete, the anode article is removed from the bath and baked to complete the polymerization of the coating.

It was very surprising to find that when the electrodeposition is carried out in the presence of the stabilizers of the present invention, the ammonia or amine (or alkanolamine) ion used for neutralizing the resin does not remain in solution. Its ultimate fate is not well-understood, but apparently it reacts with the plated-out resin at the anode. Also it appears that the alkanolamine dodecyl benzene sulfonate stabilizer additionally plates out with the resin. In any case, it has been observed that, during the deposition process, the alkalinity decreases in the presence of the stabilizer whereas previously the alkalinity increased. When the stabilizer is depleted from the bath, the alkalinity increases. The addition of more stabilizer causes a gradual decline in alkalinity until the stabilizer is again depleted. Thus it provides a method of controlling bath concentration of ammonia or amine.

Amine values of these resin solutions may vary considerably with variations in their preparation, but initial amine values of about 4-5 prior to electrodeposition are the most common. Precise data are generally of little concern to the plating operator because considerable variation is permissible without adversely affecting the coatings, but generally it is advantageous, and hence preferred, to maintain the initial amine value within about ±0.3 unit of the initial value by adding stabilizer when the amine value has departed from the initial value.

It is not intended, however, that this embodiment of the invention be limited to maintaining the amine value within ±0.3 unit. If the stabilizer was present in the solution at the start of electrodeposition of resin, the amine value will decline, or diminish, until it reaches a minimum and then begins to rise, eventually exceeding the initial value. If stabilizer was not present prior to the start electrodeposition, the amine value will gradually rise, and agglomeration will ultimately occur. In either case, the stabilizer can be added at any time prior to agglomeration and the advantages of the present invention will be obtained.

Accordingly it is an embodiment of the present invention to add an additional increment of stabilizer after the amine value has started to depart from the initial but before agglomeration of the resin occurs. The determination of amine value is well within the skill of the ordinary artisan. Similarly the detection of agglomeration is well within the skill of the ordinary artisan. Agglomeration, for example, results in a rough deposit which is easily recognizable as being unsatisfactory. The incremental amount of stabilizer solution to be added is within the skill of the ordinary artisan but generally it is contemplated that an amount approximately equal to the amount originally employed in the composition is preferred. Fractions thereof or multiples thereof can also be used without departing from the concept of this invention.

The foregoing explanation is conjectural and represents the present belief as to what occurs. However it is offered only as an aid to understanding the invention and it is not intended that the invention be limited thereby.

It was further very surprising to discover that the films deposited in the presence of the stabilizer of the present invention are generally harder than the films of the previous process. The film deposited in the presence of the AMP salt (2-amino-2-methyl-1-propanol salt of dodecyl benzene sulfonic acid) is, in particular, of superior hardness as will be seen from the examples.

The alkanolamines and the dodecyl benzene sulfonic acid useful in the preparation of the stabilizers of the present invention are commercially available and the usual commercial grades are suitable for the practice of this invention.

The invention will be better understood by reference to the following specific examples. These examples are presented for purposes of illustration only and it is not intended that the invention be limited thereby.

For use in the following examples, a water-soluble epoxy-modified alkyd resin, known in the art, was prepared according to the following formula:

|  | G. |
|---|---|
| Epoxy resin | 48 |
| Distilled linseed fatty acids | 158 |
| Trimethylolethane | 90 |
| Dimethylolpropionic acid (DMPA) | 50 |
| Phthalic anhydride | 154 |
|  | 500 |

The epoxy resin was Epon 1001 having an epoxide equivalent of 450-550 and marketed by Shell Chemical Co. The epoxy resin and fatty acid were transferred to a reaction vessel equipped with a stirrer, a distillation column and a take-off head. Sufficient xylene was added to provide a fluid mixture. The reaction mixture was heated under reflux to about 430° F. until the acid number was about 84-86. The mixture was allowed to cool somewhat. Trimethylolethane and DMPA were added and the mixture was heated to about 390° F. The phthalic anhydride was then added and the mixture was further heated to 415-420° F. and maintained at this temperature until the acid number was 56-58. The xylene was separated and the resin was allowed to cool. It was then diluted to 80% solids with a 1:1 mixture of butoxyethylene glycol and tertiary butanol and stored.

The resin solution so obtained was used to coat steel panels, as set forth in the examples, by diluting 522 g. of the resin with 3150 g. of water. To this was added 34.5 ml. of dimethylethanolamine (DMEA). This solution is hereafter designated "diluted resin solution."

Example 1

A stabilizer solution was prepared by dissolving 10 g. of dodecyl benzene sulfonic acid, 0.031 mole, in 30 g. of deionized water and adding thereto 5 g. of 2-amino-2-methyl-1-propanol, 0.056 mole; to 500 g. of the diluted resin solution was added 5 g. of the stabilizer solution to provide a ratio of 0.4% of stabilizer (dry basis) based on the resin. The stabilized resin was employed for coating a steel panel by electrodeposition at 70 volts after which it was baked for 30 minutes at 250° F. The baked film had a pencil hardness of 2H and in all other respects it was determined to be fully satisfactory. Freshly prepared unstabilized resin yielded a baked film having a hardness of HB.

Samples of the unstabilized resin and the stabilized resin were placed in storage at room temperature. Between the second and fifth weeks, the unstabilized resin had agglomerated and yielded rough films on electrodeposition and baking. The stabilized resin was held in storage and even after 11 weeks, it yielded a smooth baked film, equivalent in all respects to the film yielded by the freshly prepared, stabilized resin.

Examples 2–8

The experiment of Example 1 was repeated in all essential details except that 2-amino-2-methyl-1-propanol was omitted from the stabilizer solution and another alkanolamine was substituted therefor as indicated in Table 1. Samples of the freshly prepared resin solution were placed in storage at room temperature while other samples were used to coat steel panels by electrodeposition at 70 volts and baking at 250° F. for 30 minutes. A log of the deposition process is given in Table 2. The quality and hardness of the baked coating were evaluated and are listed in Table 1. Pencil hardness ranks as follows in order of increasing hardness: F, HB, H, 2H.

TABLE 1

| Ex. no. | Alkanolamine | Moles | Quality | Pencil hardness | Stable for, weeks |
|---|---|---|---|---|---|
| 2 | 2-amino-2-ethyl-1,3-propanediol. | 0.056 | Excellent | H | >6 |
| 3 | Triethanolamine. | 0.06 | ___do___ | F | >6 |
| 4 | 2-amino-2-hydroxymethyl-1,3-propanediol. | 0.054 | ___do___ | HB | >6 |
| 5 | 2-amino-2-methyl-1,3-propanediol. | 0.056 | ___do___ | HB | >6 |
| 6 | Monoethanolamine | 0.056 | ___do___ | F | >6 |
| 7 | Diethanolamine | 0.056 | ___do___ | F | >6 |
| 8 | 2-amino-1-butanol | 0.056 | Good | F | >6 |
|   | Unstabilized resin | | ___do___ | HB | 3-5 |

In Table 2, the plating logs for each of the above systems is presented. The amine value of the unstabilized resin increased steadily as the resin was depleted. When the stabilizer was present, however, the amine value decreased along with resin depletion. Then after reaching a minimum, the amine value rose as the stabilizer became depleted. Addition of a fresh increment of stabilizer halts this increase.

| Example no. | Cumulative number of panels plated | Amine value of solution after plating |
|---|---|---|
| Unstabilized | 0 | 5.0 |
| | 12 | 5.5 |
| | 15 | 5.6 |
| | 18 | 5.9 |
| 2 | 0 | 4.7 |
| | 2 | 4.6 |
| | 4 | 4.4 |
| | 6 | 4.5 |
| | 9 | 4.8 |
| 3 | 0 | 4.35 |
| | 3 | 4.25 |
| | 6 | 4.4 |
| | 12 | 4.45 |
| | 15 | 5.25 |
| | 18 | 5.35 |
| 4 | 0 | 5.2 |
| | 3 | 4.1 |
| | 6 | 4.35 |
| | 9 | 4.5 |
| | 12 | 5.35 |
| 5 | 0 | 4.87 |
| | 3 | 3.7 |
| | 6 | 3.99 |
| | 9 | 4.3 |
| | 12 | 4.49 |
| 6 | 0 | 4.8 |
| | 2 | 4.68 |
| | 6 | 5.2 |
| | 9 | 5.3 |
| | 12 | 5.37 |
| 7 | 0 | 4.62 |
| | 2 | 4.52 |
| | 4 | 4.52 |
| | 6 | 4.1 |
| | 9 | 4.6 |
| | 12 | 4.8 |
| 8 | 0 | 5.0 |
| | 2 | 4.6 |
| | 4 | 4.1 |
| | 6 | 4.9 |
| | 9 | 5.1 |
| | 12 | 5.2 |

The foregoing experiment was repeated 6 times except that the dodecyl benzene sulfonate salt was omitted. There were substituted therefor, respectively, sodium oleate, sodium lauryl sulfate, a non-ionic polyoxyethylene ether (Triton X–100, manufactured by Rohm and Haas Co.), and surface-active, partial ester of sorbitan (Span 80, manufactured by Atlas Chemical Co., Wilmington, Del.), a surface-active polyoxyethylene derivative of fatty acid partial ester of hexitol anhydrides (Tween 20, manufactured by Atlas Chemical Co.), and polyethylene glycol monooleate. None of these materials provided increased stability during storage.

Example 9

A water-dispersed resin composition suitable for electrodeposition was prepared by mixing 571 g. of diluted resin solution with 290 g. of pigment, 104 g. of isobutyl alcohol, 65 ml. DMEA (dimethylethanolamine), 8 g. of AMP (2-amino-2-methyl-1-propanol) stabilizer solution and 5700 ml. of water. The above composition was used as a bath for electropainting.

During the electrodeposition step, the amine value was determined periodically to prevent excessive amine build-up due to discharge at the cathode. Following is a log maintained during the electrodeposition process during which time a plurality of panels was coated.

| Time elapsed, hours | Percent solids | Amine value |
|---|---|---|
| 0 | 8.75 | 1.8 |
| 1 | 7.2 | 3.0 |
| 4.5 | 6.38 | 3.8 |
| 7.5 | 6.0 | 3.6 |
| 9.5 | [1] 8.0 | [1] 3.9 |
| 12 | 6.65 | 2.1 |
| 13.5 | 6.65 | 2.0 |

[1] 10 g. stabilizer added.

The amine value, calculated on the basis of total solids, was low at the start of the deposition process, then gradually rose as dimethylethanolamine was discharged at the cathode. It then stabilized, suggesting that dimethylethanolamine was being deposited along with the resin in the presence of the stabilizer. After 9.5 hours, additional stabilizer was added and after 12 hours the amine value had dropped to 2.1, suggesting deposition of the amine rather than discharge at the cathode. In the absence of the stabilizer, the amine value rises steadily until it reaches an undesirable value. The process is then interrupted, and the excess amine is distilled.

I claim:

1. A water-dispersed anionic resin composition stabilized against agglomeration, said resin being a water-dispersible, insulating, self cut-off anionic resin neutralized with ammonia or a water-soluble amine or alkanolamine and having an acid value of 35–120, said composition comprising said water-dispersed resin and a combination of dodecyl benzene sulfonic acid and an alkanolamine corresponding to the formula

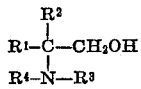

where $R^1$ is hydrogen, methyl, ethyl or hydroxymethyl; and $R^2$ is hydrogen, methyl, ethyl or hydroxymethyl, $R^3$ and $R^4$ are hydrogen or hydroxyethyl in a weight ratio of about 10 of said resin to 0.1–1.0 of said combination, wherein said alkanolamine is in a mole ratio of about 1.5–2.0:1 of said dodecyl benzene sulfonic acid.

2. A method of controlling alkalinity due to ammonia or amine, including alkanolamine, build-up in a water-dispersed resin bath during an electrodeposition of resin process said resin being a water-dispersible, insulating, self cut-off, anionic resin neutralized with ammonia or a water-soluble amine or alkanolamine and having an acid value of 35–120, comprising the step of adding as a stabilizer thereto, when the amine value departs from its initial value, and before agglomeration of said resin, an increment of the salt of a primary alkanolamine and dodecyl benzene sulfonic acid in a mole ratio of about 1.5–2.0:1, said alkanolamine corresponding to the formula

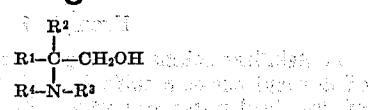

where $R^1$ is hydrogen, methyl, ethyl or hydroxymethyl; and $R^2$ is hydrogen, methyl, ethyl or hydroxymethyl, $R^3$ and $R^4$ are hydrogen or hydroxymethyl.

3. In a process for coating an article by electrodeposition of a water-dispersed insulating, self cut-off anionic resin neutralized with ammonia, an amine or an alkanolamine, the improvement comprising the step of adding thereto a mixture of a primary alkanolamine and dodecyl benzene sulfonic acid in a mole ratio of 1–2:1 in an amount of 0.1 to 1.0% by weight of said resin present, said addition being effected when the amine value of said resin has departed from the initial value by about ±0.3 unit.

References Cited

UNITED STATES PATENTS

| | | | |
|---|---|---|---|
| 3,230,162 | 1/1966 | Gilchrist | 204—181 |
| 3,427,266 | 2/1969 | Phillips et al. | 260—22 |
| 3,434,952 | 3/1969 | Tsou | 204—181 |
| 3,434,988 | 3/1969 | Graver et al. | 260—23.7 |
| 3,455,805 | 7/1969 | Smith et al. | 204—181 |
| 3,625,988 | 12/1971 | Cyba | 260—45.9 |

DONALD E. CZAJA, Primary Examiner

R. W. GRIFFIN, Assistant Examiner

U.S. Cl. X.R.

117—132 BE, 132 B; 204—181; 260—29.2 R, 29.2 EP, 29.2 E, 29.2 UA, 32.4, 32.6 R, 45.9 R, 501.19